United States Patent
Park et al.

(10) Patent No.: US 9,510,312 B2
(45) Date of Patent: Nov. 29, 2016

(54) METHOD AND APPARATUS FOR PERFORMING NETWORK ENTRY/REENTRY IN WIRELESS COMMUNICATION SYSTEM

(75) Inventors: Kyujin Park, Anyang-si (KR); Hangyu Cho, Anyang-si (KR); Jinsoo Choi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 128 days.

(21) Appl. No.: 13/880,330

(22) PCT Filed: Oct. 21, 2011

(86) PCT No.: PCT/KR2011/007884
§ 371 (c)(1),
(2), (4) Date: Apr. 18, 2013

(87) PCT Pub. No.: WO2012/053857
PCT Pub. Date: Apr. 26, 2012

(65) Prior Publication Data
US 2013/0208694 A1   Aug. 15, 2013

Related U.S. Application Data

(60) Provisional application No. 61/405,212, filed on Oct. 21, 2010, provisional application No. 61/409,988, filed on Nov. 4, 2010.

(51) Int. Cl.
*H04W 72/04* (2009.01)
*H04W 74/08* (2009.01)
(Continued)

(52) U.S. Cl.
CPC ........... *H04W 60/00* (2013.01); *H04W 74/004* (2013.01); *H04W 4/005* (2013.01)

(58) Field of Classification Search
CPC ............. H04W 28/20; H04W 72/042; H04W 72/0406; H04W 4/005; H04W 72/0413; H04W 72/04; H04W 74/002; H04W 74/004; H04W 56/00; H04W 74/04; H04W 24/10; H04W 4/20; H04L 5/0053; H04L 5/0094; H04L 5/0048
USPC ........ 370/329, 311, 328, 459, 252; 455/515, 455/434, 458, 450, 502, 509
See application file for complete search history.

(56) References Cited

U.S. PATENT DOCUMENTS

2006/0030305 A1   2/2006   Lee et al.
2006/0203712 A1*  9/2006   Lim et al. .................... 370/208
(Continued)

FOREIGN PATENT DOCUMENTS

CN   101036411 A   9/2007
EP   2182328 A1    5/2010
(Continued)

OTHER PUBLICATIONS

Chiu et al. U.S. Appl. No. 61/381786, filed Sep. 10, 2010.*
(Continued)

*Primary Examiner* — Wutchung Chu
(74) *Attorney, Agent, or Firm* — Dentons US LLP

(57) ABSTRACT

Disclosed is a method in which a machine-to-machine (M2M) device and a base station in a wireless communication system perform network reentry comprises the steps of: receiving, from a base station, information related to an uplink resource for the transmission of a ranging request message; and transmitting the ranging request message to the base station on the basis of the received information related to the uplink resource.

10 Claims, 6 Drawing Sheets

(51) Int. Cl.
*H04L 5/00* (2006.01)
*H04W 60/00* (2009.01)
*H04W 74/00* (2009.01)
*H04W 4/00* (2009.01)

(56) References Cited

U.S. PATENT DOCUMENTS

| | | | |
|---|---|---|---|
| 2007/0218889 A1* | 9/2007 | Zhang et al. | 455/422.1 |
| 2007/0293244 A1* | 12/2007 | Lee et al. | 455/456.5 |
| 2008/0137582 A1* | 6/2008 | Kim et al. | 370/315 |
| 2008/0194262 A1* | 8/2008 | Choi et al. | 455/437 |
| 2009/0143089 A1* | 6/2009 | Ji et al. | 455/517 |
| 2009/0209199 A1* | 8/2009 | Suga | 455/7 |
| 2009/0280812 A1* | 11/2009 | Cheng et al. | 455/436 |
| 2010/0057485 A1 | 3/2010 | Luft | |
| 2010/0251083 A1* | 9/2010 | Cho et al. | 714/807 |
| 2010/0260128 A1 | 10/2010 | Cho et al. | |
| 2010/0272020 A1* | 10/2010 | Norp | H04W 48/17 370/328 |
| 2010/0303039 A1* | 12/2010 | Zhang | H04L 5/0035 370/331 |
| 2011/0106952 A1* | 5/2011 | Doppler | H04W 72/0406 709/226 |
| 2011/0223942 A1* | 9/2011 | Xu | H04W 68/00 455/458 |
| 2011/0243080 A1* | 10/2011 | Chen et al. | 370/329 |
| 2011/0274040 A1* | 11/2011 | Pani | H04W 4/005 370/328 |
| 2011/0310868 A1* | 12/2011 | Yang | H04W 68/00 370/338 |
| 2012/0026941 A1* | 2/2012 | Ahmad et al. | 370/328 |
| 2012/0058764 A1* | 3/2012 | Kang et al. | 455/435.1 |
| 2012/0063305 A1* | 3/2012 | Chiu et al. | 370/230 |
| 2012/0093052 A1* | 4/2012 | Kang et al. | 370/311 |
| 2012/0106431 A1* | 5/2012 | Wu | H04W 4/00 370/312 |
| 2012/0178485 A1* | 7/2012 | Zeira | H04W 4/08 455/515 |
| 2012/0196608 A1* | 8/2012 | Ting | H04W 74/085 455/450 |
| 2012/0302229 A1* | 11/2012 | Ronneke | H04L 29/12754 455/422.1 |
| 2013/0040680 A1* | 2/2013 | Kim et al. | 455/509 |
| 2013/0072245 A1* | 3/2013 | Lee et al. | 455/509 |

FOREIGN PATENT DOCUMENTS

| | | |
|---|---|---|
| KR | 10-2010-0088773 A | 8/2010 |
| WO | WO 2009-092115 A2 | 7/2009 |

OTHER PUBLICATIONS

"3rd Generation Partnership Project; Technical Specification Group Services and System Aspects; System Improvements for Machine-Type Communications; (Release 10)", 3GPP TR 23.888 vo.5.1, 3rd Generation Partnership Project (3GPP), Mobile Competence Centre, Aug. 24, 2010, XP050458398.

* cited by examiner

METHOD AND APPARATUS FOR PERFORMING NETWORK ENTRY/REENTRY IN WIRELESS COMMUNICATION SYSTEM

This Application is a 35 U.S.C. §371 National Stage Entry of International Application No. PCT/KR2011/007884, filed Oct. 21, 2011 and claims the benefit of U.S. Provisional Application No. 61/405,212, filed Oct. 21, 2010 and 61/409,988, filed Nov. 4, 2010, all of which are incorporated by reference in their entirety herein.

TECHNICAL FIELD

The present invention relates to a wireless communication, and more particularly, to a method of performing a network entry/reentry in a wireless communication system and apparatus therefor.

BACKGROUND ART

Broadband wireless communication system is based on an orthogonal frequency division multiplexing (OFDM) scheme, an orthogonal frequency division multiple access (OFDMA) scheme or an orthogonal frequency division multiple access (OFDMA) scheme and enables fast data transmission in a manner of transmitting a physical channel signal using multiple subcarriers.

A downlink data type transmitted to a mobile station by a base station is mainly classified into a multicasting/broadcasting data type and a unicast data type. The multicasting/broadcasting data type can be used by the base station in transmitting such information as system information, configuration information, software upgrade information and the like to at least one or more groups to which non-specific/specific mobile stations belong. And, the unicast data type can be used by the base station in transmitting a request information to a specific mobile station or sending a message containing information (e.g., configuration information) which should be delivered to a specific mobile station only.

Meanwhile, an uplink data type transmitted to a base station, a different mobile station or the like by a mobile station consists of a unicast data type. The mobile station is able to send a message containing information, which will be finally delivered to a different mobile station, a server or the like, to the base station.

A conventional communication was mainly a communication performed between a mobile station used by a user and a base station. Yet, the development of communication technologies has enabled a machine-to-machine communication. The machine-to-machine (hereinafter abbreviated M2M) communication literally means a communication between one electronic device and another electronic device. In a broad sense, the M2M communication may mean a wire/wireless communication between electronic devices or a communication between a human-controllable device and a machine. Recently, the M2M communication may generally indicate a communication between electronic devices, i.e., a device-to-device wireless communication.

In the early 1990's, in which the concept of the M2M communication has been initially introduced, the M2M communication has been recognized as remote control or telematics and derivative markets of the M2M communication were very limitative. Yet, the M2M communication has grown rapidly for past few years and has been introduced into the globally noteworthy markets as well as Korean market. Specifically, in POS (point of sales) and security related application markets, the M2M communication has considerable influence on such field as fleet management, remote monitoring of machinery and equipment, smart meter for auto-measurement of operating time, consumed heat or electricity quantity on construction machinery equipment and the like. M2M communication in the future will be further utilized for various usages in connection with small-scale output communication solutions for conventional mobile communication, wireless high-speed internet, Wi-Fi, ZigBee and the like and may lay the foundation of expansion to B2C (business to consumer) markets instead of being confined to B2B (business to business) markets.

In the era of the M2M communication, every machine equipped with SIM card enables data transmission and reception and is capable of remote management and control. For instance, as M2M communication technology is usable for numerous devices and equipments including cars, trucks, trains, containers, auto-vending machines, gas tanks and the like, its application fields may reach far and wide.

The M2M device makes a report to a base station on a long-term basis. Alternatively, the M2M device makes a report to the base station if an event is triggered. In particular, while the M2M device mostly stays in an idle state, if a long-term cycle returns or an event is triggered, the M2M device awakes and then enters an active state.

To this end, the M2M device should perform a network entry/reentry procedure with the base station. However, any efforts or attempts have not been made to research and develop a method for an M2M device, of which properties are different from those of a mobile station, to perform a network entry/reentry procedure with a base station.

DISCLOSURE OF THE INVENTION

Technical Task

A technical task intended to achieve in the present invention is to provide a method for an M2M (machine to machine) device to perform a network reentry in a wireless communication system.

Another technical task intended to achieve in the present invention is to provide a method for a base station to perform a network reentry with an M2M (machine to machine) device in a wireless communication system.

Another technical task intended to achieve in the present invention is to provide an M2M (machine to machine) device, by which a network reentry can be performed.

A further technical task intended to achieve in the present invention is to provide a base station, by which a network reentry can be performed with an M2M (machine to machine) device in a wireless communication system.

Technical tasks obtainable from the present invention are non-limited the above mentioned technical tasks. And, other unmentioned technical tasks can be clearly understood from the following description by those having ordinary skill in the technical field to which the present invention pertains.

Technical Solution

To achieve the technical task and in accordance with the present invention, as embodied and broadly described, a method of performing a network reentry by an M2M (machine-to-machine) device in a wireless communication system, according to the present invention may include the steps of receiving information related to an uplink resource for transmitting a ranging request message from a base station and transmitting the ranging request message based on the received information related to the uplink resource to the base station. The method may further include the step of receiving a ranging response message including assigned uplink bandwidth information from the base station in response to the ranging request message and the ranging request message may include a bandwidth request indicator. The information related to the uplink resource may be transmitted through a paging message. The information related to the uplink resource may include information regarding to a transmission timing of control information including uplink resource information allocated for a ranging request transmission. The information related to the uplink resource may include information indicating the uplink resource allocated for the ranging request transmission and wherein the ranging request message is transmitted to the base station through the indicated uplink resource. The control information may correspond to CDMA Allocation A-MAP IE message type. The uplink resource is a dedicated resource for the M2M device. The M2M device is a fixed M2M device.

To achieve another technical task and in accordance with the purpose of the present invention, as embodied and broadly described, a method of performing a network reentry by a base station with an M2M (machine-to-machine) device in a wireless communication system, may include the steps of transmitting information related to an uplink resource for transmitting a ranging request message to the M2M device and receiving the ranging request message based on the received information related to the uplink resource from the M2M device. The method may further include the step of transmitting a ranging response message including assigned uplink bandwidth information to the M2M device in response to the ranging request message and the ranging request message may include a bandwidth request indicator.

To achieve another technical task and in accordance with the purpose of the present invention, an M2M (machine to machine) device for performing a network reentry in a wireless communication system, may include a receiver configured to receive information related to an uplink resource for transmitting a ranging request message from a base station and a transmitter configured to transmit the ranging request message based on the received information related to the uplink resource to the base station. The receiver may receive a ranging response message including assigned uplink bandwidth information from the base station in response to the ranging request message and the ranging request message may include a bandwidth request indicator To achieve further technical task and in accordance with the purpose of the present invention, a base station for performing a network reentry with an M2M (machine-to-machine) device in a wireless communication system, may include a transmitter configured to transmit information related to an uplink resource for transmitting a ranging request message to the M2M device and a receiver configured to receive the ranging request message based on the received information related to the uplink resource from the M2M device. The transmitter may transmit a ranging response message including assigned uplink bandwidth information to the M2M device in response to the ranging request message and the ranging request message may include a bandwidth request indicator.

Advantageous Effects

In a network entry/reentry method according to the present invention, an M2M (machine to machine) device is able to quickly perform a network entry/reentry on a base station.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE or LTE-A system, they are applicable to other random mobile communication systems except unique features of the 3GPP LTE or LTE-A system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station is a common name of such a random node of a network stage communicating with a terminal as a Node B, an eNode B, a base station (BS), an access point (AP) and the like. In the present specification, although the present invention is described based on the GPP LTE or LTE-A system, the contents of the present invention are applicable to various kinds of communication systems.

In a mobile communication system, a mobile station (or a user equipment) may be able to receive information in downlink from a base station and transmit information in uplink to the base station. The informations transmitted or received by the mobile station may include data and various control informations. And, various kinds of physical channels may exist in accordance with types and usages of the informations transmitted or received by the mobile station.

Figure 1:
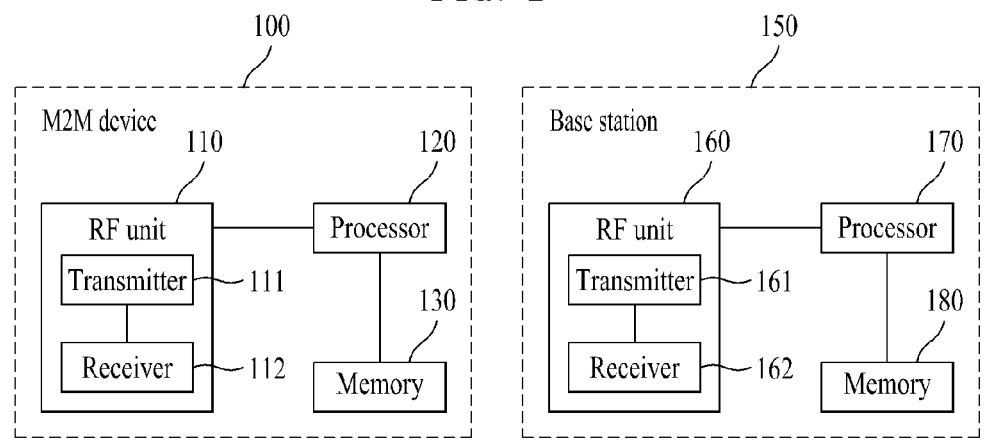
FIG. 1 is a diagram to schematically describe device configurations of devices an M2M device, a base station and the like according to one embodiment of the present invention.

FIG. 1 is a diagram to schematically describe device configurations of devices an M2M device, a base station and the like according to one embodiment of the present invention.

Referring to FIG. 1, an M2M device (or an M2M communication device) may include an RF unit 110, a processor 120 and a memory 130 that is optional. And, a base station 150 may include an RF unit 160, a processor 170 and a memory 180 that is optional. The RF unit 110/160 may include a transmitter 111/161 and a receiver 112/162. For example of the M2M device 100, the transmitter 111 and the receiver 112 are configured to transceive signals with the base station 150 and other M2M devices. The processor 120 may be configured to control a process for the transmitter 111 and the receiver 112 to transceive signals with other devices in a manner of being functionally connected to the transmitter 111 and the receiver 112. The processor 120 performs various kinds of processings on a signal and then transmits the processed signal to the transmitter 111. And, the processor 120 may be able to perform a processing on a signal received by the receiver 112. If necessary, the processor 120 may control information contained in an exchanged message to be saved in the memory 130. The above-configured M2M device 100 may be able to implement various embodiments of a method mentioned in the following description.

The M2M device 100 may further include various kinds of additional configurations (not shown in the drawing) in accordance with its application type. In case that the corresponding M2M device 100 is provided for the intelligent metering, it may include an additional configuration for power measurement and the like. This power measuring operation may be performed under the control of the processor 120 shown in FIG. 1 or a separately configured processor (not shown in the drawing).

Although FIG. 1 shows one example of a case that a communication is performed between the M2M device 100 and the base station 150, the M2M communication method according to the present invention may be performed between M2M devices. In doing so, each of the devices may have the same configuration of the device shown in FIG. 1, thereby implementing the various embodiments of the method mentioned in the following description.

On the other hand, the transmitter 161 and the receiver 162 of the base station 150 are configured to transceive signals with other base stations, an M2M server and M2M devices. The processor 170 may be configured to control a process for the transmitter 161 and the receiver 162 to transceive signals with other devices in a manner of being functionally connected to the transmitter 161 and the receiver 162. The processor 170 performs various kinds of processings on a signal and then transmits the processed signal to the transmitter 161. And, the processor 170 may be able to perform a processing on a signal received by the receiver 162. If necessary, the processor 170 may control information contained in an exchanged message to be saved in the memory 180. The above-configured base station 150 may be able to implement various embodiments of a method mentioned in the following description.

The processor 120/170 of the M2M device/base station 110/150 directs operations (e.g., control, adjustment, management, etc.) of the M2M device/base station 110/150. The processor 120/170 may be connected to the memory 130/180 configured to store program codes and data. The memory 130/180 is connected to the processor 120/170 to store operating systems, applications and general files.

The processor 120/170 may be called one of a controller, a microcontroller, a microprocessor, a microcomputer and the like. And, the processor 120/170 may be implemented using hardware, firmware, software and/or any combinations thereof. In case of implementing the embodiments of the present invention using hardware, the processor 120/170 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded on the processor 120/170 or saved in the memory 130/180 to be driven by the processor 120/170.

The above-mentioned device for performing M2M communications may be variously named one of an M2M device, an M2M communication device, an MTC (machine type communication) device and the like. And, a conventional mobile station may be named an HTC (human type communication) mobile station.

The number of M2M devices will increase gradually in a prescribed network in response to the increasing number of machine application types. The currently discussed machine application types may include (1) security, (2) public safety, (3) tracking and tracing, (4) payment, (5) healthcare, (6) remote maintenance and control, (7) metering, (8) consumer device, (9) POS (Point Of Sales) and fleet Management in security related market, (10) M2M communication of vending machine (11) smart meter for plant and machinery remote monitoring, operating time measurement on measurement on construction plant and machinery and auto-measurement of consumed heat or electricity quantity on construction plant and machinery, (12) surveillance video communication and the like, by which the machine application types may be non-limited. And, there are ongoing discussions on other machine application types. As the number of machine application types increases, the number of M2M communication devices may increase rapidly compared to the number of general mobile communication devices.

Regarding the properties of M2M devices, as mentioned in the foregoing description, the M2M device transmits a traffic to a base station on long-term basis or performs a data transmission in case of occurrence of event triggering. In particular, while staying in idle state mostly, the M2M device awakes and then enters an active state when a long-term cycle returns or an event is triggered. And, most of the M2M devices may have low mobility or no mobility at all. As the application types of M2M devices having no mobility are continuously increasing, numerous M2M devices of the increasing application types will exist in a same base station.

According to one property of M2M devices, there is a time-controlled operation. A time-controlled traffic implicates an absence of 'ad-hoc' packet transmission to/from an M2M device. A system may be able to support the time-controlled operation and an M2M device is able to transmit or receive data in a predefined time interval only. Most of M2M applications include a portion of the time-controlled traffic. A difference between the M2M applications corresponds to an occupancy rate difference between the time-controlled traffic and the ad-hoc traffic only.

Another property of the M2M device includes low mobility or absence of mobility. If the M2M device has considerably low mobility or no mobility, it means that the M2M device is stationary. The system may be able to simplify or optimize mobility-related operations for such a specific M2M application having a stationary location as secured access and surveillance, public safety, payment, remote maintenance and control, metering and the like.

Regarding a network reentry procedure from an idle mode, a network deregistration or RRC disconnection procedure for an entry into an idle mode, a current wireless mobile network basically assumes random traffic generation and mobility of a mobile station. Yet, a current device state transition procedure and device operations in the respective states may not be efficient in M2M communication scenarios. Therefore, it may be necessary to partially modify the device state transition procedure and the device operations in the respective states, which basically assume the conventional mobility and random traffic generation.

Figure 2:
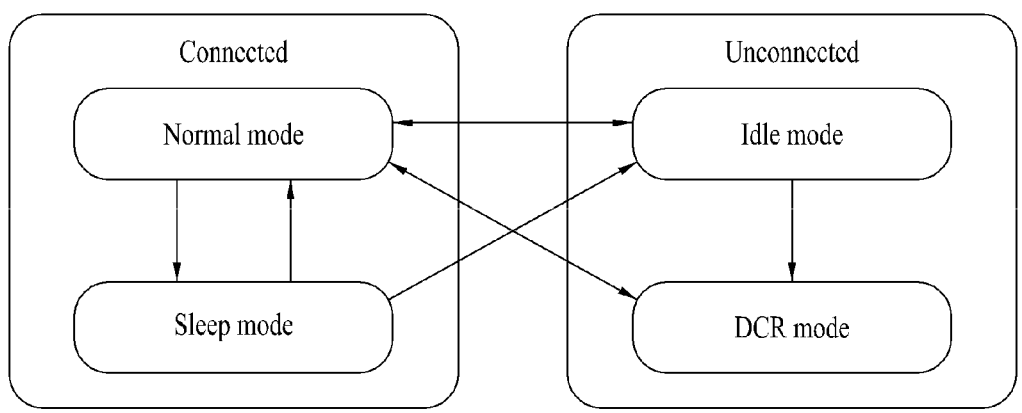
FIG. 2 is a diagram of a mobile station state in IEEE 802.16m system for example of a mobile communication system.

FIG. 2 is a diagram of a mobile station state in IEEE 802.16m system for example of a mobile communication system.

Referring to FIG. 2, a state of a mobile station may be mainly classified into a connected state and an unconnected state. In the connected state, the mobile station may be in a normal mode or a sleep mode. Moreover, in the unconnected state, the mobile station may be in an idle mode or a DCR (deregistration with context retention) mode.

In IEEE 802. 16m, which is one example of a mobile communication system, a sleep mode and an idle mode are defined to minimize power consumption of a mobile station. In the sleep mode, a sleep mode pattern configured with a sleep window and a listening window, which are approved by a base station through AAI-SLP-REQ/AAI-SLP-RSP message signaling between a mobile station and a base station for power saving of the mobile station, is operated. In the idle mode, a paging group, a paging cycle and a paging offset, which are approved by a base station through AAI-DREG-REQ/AAI-DREG-CMD message signaling between a mobile station and a base station for the power saving of the mobile station and the idle radio resource saving of the mobile station.

In the normal mode, which is discriminated from the sleep mode or the idle mode, a mobile station performs a service provided by a corresponding system by achieving resource and session configuration through network entry.

A basic operation of a sleep mode is described as follows. First of all, if a traffic is not generated from uplink or downlink for a predetermined time in a normal mode, a mobile station sends AI-SLP-REQ message to a base station to make a request for a transition to a sleep mode. Once the request for the operation in the sleep mode is received via the AAI-SLP-REQ message, the base station gives a final approval for the request via AAI-SLP-RSP message. The mobile station receives assignment of an ID (SLPID) for identifying the mobile station operating in the sleep mode through the reception of the AAI-SLP-RSP message and then operates the sleep mode.

In this case, major parameters obtained through the message signaling between the mobile station and the base station include an initial sleep window, a final sleep window base for designating a size of a final sleep interval a final sleep window exponent and a listening window for setting a size of a listening interval. And, a unit of each of the parameters is a frame. In particular, the sleep window is an interval in which a mobile station operating in a sleep mode minimizes its power consumption. In this interval, the mobile station does not receive DL control information and downlink traffic. And, the listening window is an interval in which the mobile station operating in the sleep mode gests out of the sleep window, receives AAI-TRF-IND message sent by the base station, and determines a presence or non-presence of a downlink traffic sent to the mobile station. In this interval, the mobile station is able to receive downlink control information and downlink traffic.

A basic operation of an idle mode is described as follows. First of all, if a traffic is not generated in uplink or downlink for a predetermined time, a mobile station sends AAI-DREG-REQ message (De-Registration_Request_Code=0x01) to make a request for a transition to an idle mode to a base station, receives AAI-DREG-CMD message (Action code=0x05) from the base station, and then operates the idle mode. In the AAI-DREG-REQ message, a paging cycle (=16 bits) requested by the mobile station is defined. In the DREG-CMD message sent to the mobile station by the base station having received the AAI-DREG-REQ message, a paging group ID, a paging offset and a paging cycle are defined. The mobile station configures a paging unavailable interval and a paging listening interval for the parameter. In the paging unavailable interval, the mobile station turns off a modem. The paging listening interval is set to an interval of 2 to 5 frames from a frame that meets 'Frame Number (FN) % Paging Cycle=Paging Offset' of a channel currently synchronized with the base station. And, the mobile station receives AAI-PAG-ADV message sent from the base station in the paging listening interval. The AAI-PAG-ADV message includes MAC address hash information, which indicates mobile stations requiring location update or initial network entry among mobile station operating in the idle mode, and action code for describing a procedure necessary to be performed per mobile station.

If a traffic to the mobile station operating in the idle mode is generated, the base station sends AAI-PAG-ADV message (Action code=0x02: This means 'Enter Network') to the mobile station in a next paging listening interval. Having received the AAI-PAG-ADV message, the mobile station enters the normal mode from the idle mode.

Meanwhile, a base station may force a mobile station to enter an idle mode. In doing so, the base station sends AAI-DREG-CMD message (Action code=0x05) to the mobile station. Since the mobile station receives the AAI-DREG-CMD message without sending AAI-DREG-REQ message yet, the mobile station having received the AAI-DREG-CMD message sends AAI-DREG-REQ (De-Registration_Request_Code=0x02) to the base station and then enters the idle mode. After the mobile station has entered the idle mode, if AAI-PAG-ADV (Action code=0x00: This means No Action) is received in the paging listening interval, the mobile station keeps maintaining the idle mode. Before the idle mode is entered, if a paging group ID of a base station having received the AAI-DREG-CMD message is different from that of the base station currently sending the AAI-PAG-ADV message or a message of AAI-DREG-CMD (Action code=0x01: This means Location Update) is received, the mobile station performs the location update.

Both of the sleep mode and the idle mode defined in IEEE 802.16m system are available to efficiently manage use power consumption of a mobile station. IEEE 802.16e describes an independent operation method for each of the sleep mode and the idle mode but fails to describe an operation method for a case that the two technologies coexist. In case of the sleep mode, while synchronization between a mobile station and a base station is maintained, it is able to maintain a previous context. Hence, if a traffic (e.g., an uplink traffic, a downlink traffic, etc.) to the mobile station is generated, it is advantageous in that a connection can be quickly established. Yet, in case that a base station change occurs in a sleep window, even if a traffic to the mobile station is not contiguously generated, a network reentry is performed and a normal mode is then maintained for prescribed duration. Thereafter, the sleep mode can be entered again though AAI-SLP-REQ/AAI-SLP-RSP message signaling between the mobile station and the base station.

The idle mode is advantageous in securing mobility by performing a location update. Yet, if a traffic to a mobile station is generated, it is necessary to re-attempt a network entry for the transition to a normal mode. Hence, if the traffic to the mobile station is generated, it is disadvantageous in that the idle mode is connected slower than the sleep mode.

An idle state operation or an idle mode operation means an operation of supporting a mobile station, which is moving a radio link environment configured with multiple base stations in general, to perform a downlink broadcast traffic transmission by periods despite not being registered with a specific base station. If the mobile station fails to receive a traffic from a base station for a prescribed time, the mobile station may be able to enter an idle state to save power. Having entered the idle mode, the mobile station receives a broadcast message (e.g., a paging message) broadcasted by the base station during an available interval and is then able to determine whether to enter a normal mode or stay in the idle state. Moreover, the mobile station in the idle state performs a location update, thereby informing a paging controller of its location.

The idle state may give a benefit to a mobile station by removing activation requirements related to a handover and general operation requirements. The idle state restricts mobile station activity only to be scanned in a discrete cycle, thereby saving power and operation resources used by a mobile station. The idle state provides a simple and appropriate method of informing a mobile station on a downlink traffic in pending. And, the idle state is able to give benefits to a network and a base station by removing radio interface and network handover (HO) traffics from an inactive mobile station.

Paging means a function of obtaining a location (e.g., a prescribed base station, a prescribed exchange station, etc.) of a mobile station corresponding to an incoming signal occurrence in mobile communications. A multitude of base stations supportive of an idle state or an idle mode may be able to configure a paging region by belonging to a specific paging group. In this case, the paging group indicates a logical group. If there is a traffic targeting a mobile station, the purpose of the paging group is to provide an adjacent range region that can be paged in downlink. The paging group is preferably configured to meet such a condition as a condition that the paging group is large enough for a specific mobile station to exist in the same paging group during most of time, a condition that the paging group is small enough to enable a paging load to maintain an appropriate level.

A paging group may include at least one base station. And, one base station may be included in at least one or more paging groups. The paging group is defined by a management system. The paging group may be able to use a paging group-action backbone message. A paging controller manages a list of mobile stations in idle state using a paging-announce message corresponding to one of backbone network messages. And, the paging controller is able to manage initial paging of every base station belonging to a paging group.

Figure 3:
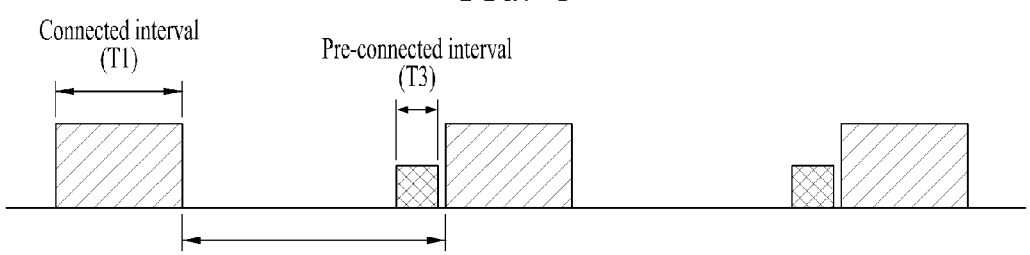
FIG. 3 is a diagram to describe one example of a state transition method of an M2M device according to the present invention.
Figure 3:
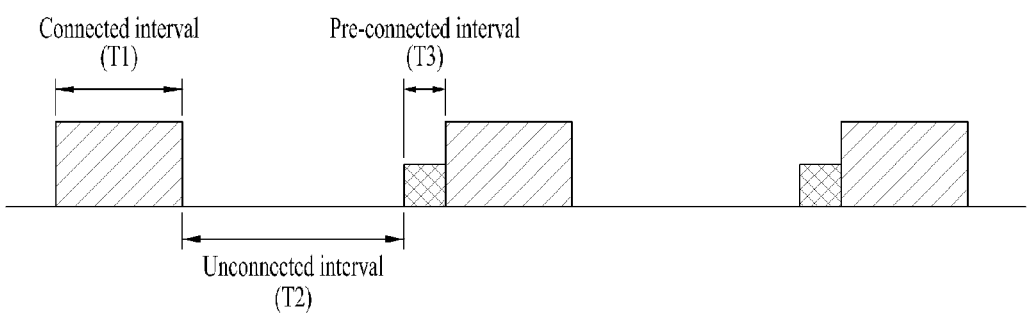

FIG. 3 is a diagram to describe one example of a state transition method of an M2M device according to the present invention.

First of all, it is able to define a procedure for state transition of an M2M device. FIG. 3 relates to a time-controlled M2M device. A base station is able to configure a connected interval T1 connected for a specific M2M device periodically and repeatedly, an unconnected interval T2, and a pre-connected interval T3. In this case, the M2M device may have the pre-connected interval T3 set previous to the connected interval T1 to prepare for a connecting operation in the connected interval.

Prior to describe the operations of the M2M device in the connected interval T1, the unconnected interval T2 and the pre-connected interval T3, a process for performing a network entry (or a reentry) of a mobile station in such a mobile communication system as IEEE 802.16m system, 3GPP LTE system, 3GPP LTE-A system and the like is schematically described as follows.

Figure 4:
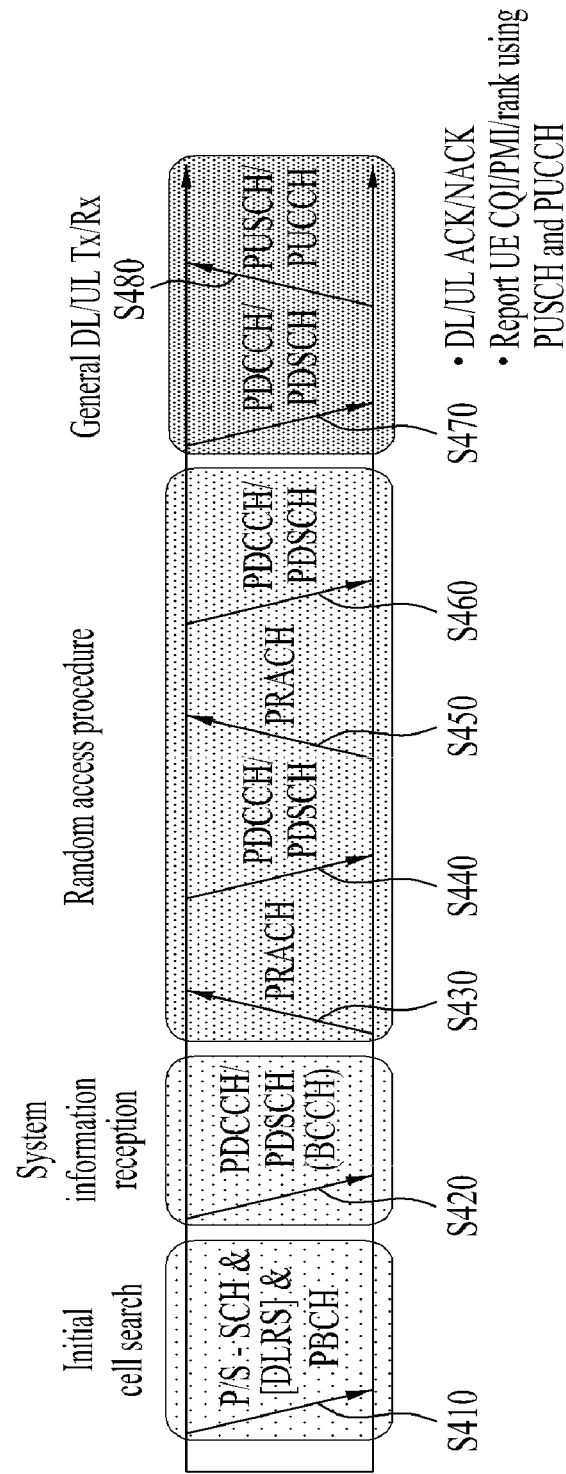
FIG. 4 is a diagram to describe physical channels used by 3GPP LTE system for example of a mobile communication system and a general signal transmitting method using the physical channels.

FIG. 4 is a diagram for explaining physical channels used by 3GPP LTE system and a general signal transmitting method using the same.

If a power of a turned-off mobile station is turned on again or a mobile station newly enters a cell, the corresponding mobile station performs an initial cell search for matching synchronization with a base station and the like [S410]. To this end, the mobile station receives a primary synchronization channel (P-SCH) and a secondary synchronization channel (S-SCH) from the base station, matches synchronization with the base station, and obtains information such as a cell ID and the like. Subsequently, the mobile station receives a physical broadcast channel from the base station and is then able to obtain intra-cell broadcast information. Meanwhile, the mobile station receives a downlink reference signal (DL RS) in the initial cell searching step and is then able to check a downlink channel state.

Having completed the initial cell search, the mobile station receives a physical downlink control channel (PD-CCH) and a physical downlink shared control channel (PDSCH) according to the physical downlink control channel (PDCCH) information and is then able to obtain further detailed system information [S420].

Meanwhile, if the mobile station initially accesses the base station or fails to have a radio resource for signal transmission, the mobile station is able to perform a random access procedure (RACH) [S430 to 460]. To this end, the mobile station transmits a specific sequence as a preamble via a physical random access channel (PRACH) [S430] and is then able to receive a response message via PDCCH and a corresponding PDSCH in response to the preamble [S440]. In case of a contention based random access except a case of handover, it is able to perform a contention resolution procedure such as an additional physical random access channel transmission and a physical downlink control channel/physical downlink shared channel reception [S450, S460].

Having performed the above mentioned procedure, the mobile station is able to perform PDCCH/PDSCH reception [S470] and PUSCH/PUCCH (physical uplink shared channel/physical uplink control channel) transmission [S480] as a general uplink/downlink signal transmission procedure. In doing so, control information transmitted/received in uplink/downlink to/from the base station by the mobile station includes DL/UL ACK/NACK signal, CQI (channel quality indicator), PMI (precoding matrix index), RI (rank indicator) and the like. In case of the 3GPP ($3^{rd}$ generation partnership project) LTE (long term evolution) system, the mobile station is able to transmit the above mentioned control information such as CQI, PMI, RI and the like via PUCCH and/or PUSCH.

In the following description, a process for a mobile station to performs a network entry (or reentry) in IEEE 802.16m system for example of a mobile communication system is schematically explained.

Figure 5:
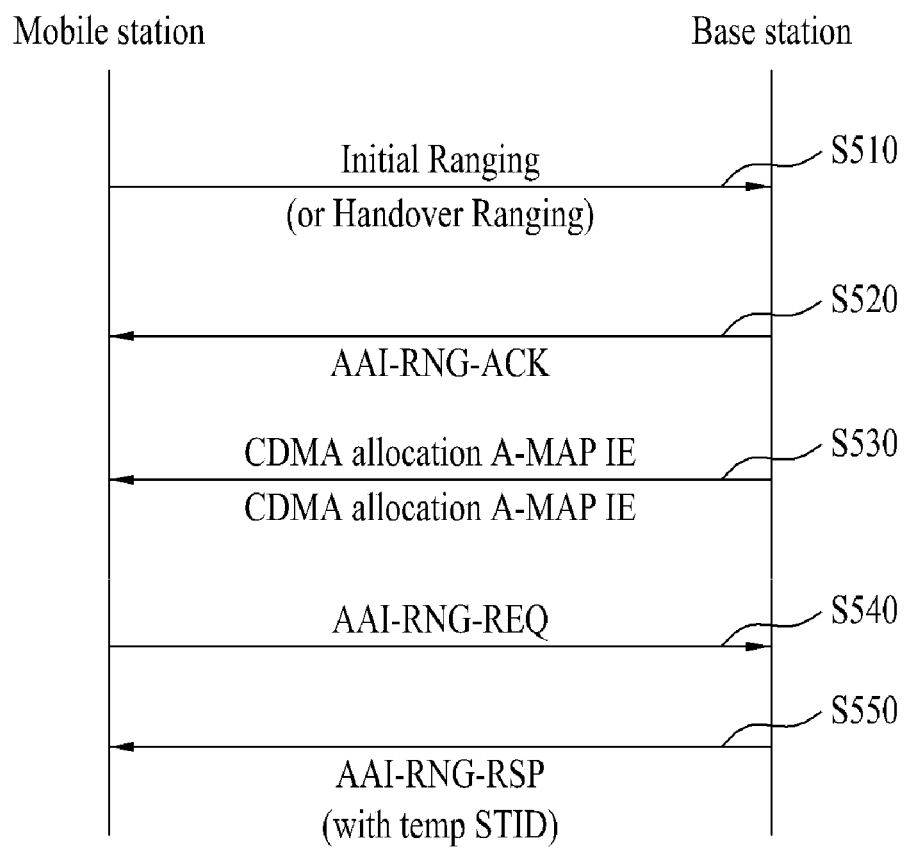
FIG. 5 is a diagram of a process for a mobile station to performs a network entry (or reentry) in IEEE 802.16m system for example of a mobile communication system.

FIG. 5 is a diagram of a process for a mobile station to performs a network entry (or reentry) in IEEE 802.16m system for example of a mobile communication system.

Referring to FIG. 5, a mobile station transmits an initial ranging or a handover ranging to a base station [S510]. In the following description, assume that the mobile station transmits the initial ranging for example. The initial ranging is a process for enabling the mobile station to obtain an accurate timing offset with the base station and adjust a transmission power initially. Generally, if a power of the mobile station is turned on, the mobile station obtains downlink synchronization from a received downlink preamble signal. Subsequently, the mobile station performs the initial ranging to adjust an uplink timing offset and a transmission power. The mobile station selects a ranging channel, selects a ranging preamble code from an initial ranging domain, and then transmits the selected ranging preamble code to the base station via the selected ranging channel [S510].

Thereafter, the base station may be able to send a reception acknowledged response message to the mobile station in response to the initial or handover ranging transmission of the mobile station [S520]. In this case, the response message may be defined as AAI-RNG-ACK message. In particular, the AAI-RNG-ACK message is the message that provides a response to indicate that all of the ranging preamble codes are successfully received and detected in all ranging opportunities. The base station may be able to send the AAI-RNG-ACK message that contains three kinds of ranging statuses available for the initial ranging or the handover ranging. In this case, the three kinds of the ranging statuses contained in the AAI-RNG-ACK message may include 'continue' status, 'success' status and 'abort' status.

In case that the ranging status for the initial ranging or the handover ranging is the 'success' status, the base station is able to send information required for the AAI-RNG-REQ message to the mobile station via CDMA Allocation A-MAP-IE [S530]. In particular, the base station provides the mobile station with uplink resource allocation information for the ranging request transmission and the like via the CDMA Allocation A-MAP-IE message shown in Table 2. If the mobile station sends the ranging to the base station, the base station may be able to send uplink resource information on uplink resource allocated for the transmission of a ranging request message via a resource index field and the like. If the mobile station receives the CDMA Allocation A-MAP-IE from the base station [S530], the mobile station sends a message for requesting a ranging to the base station [S540]. Thereafter, the mobile station is able to receive a ranging response message from the base station in response to the ranging request message [S550].

In the following description, operations of an M2M device in the connected interval T1, the unconnected interval T2 and the pre-connected interval T3 are explained.

First of all, in the connected interval, operations of the M2M device are identical to those of a mobile station in a connected mode (or an active mode) applicable in such a mobile communication system as IEEE 802.16 system, 3GPP LTE system, 3GPP LTE-A system and the like.

Yet, in the unconnected interval, the M2M device may operate by one of about 3 kinds of optional methods. The $1^{st}$ optional method is a modified idle operation. A $1^{st}$ modified idle mode is the mode of performing a paging only on a fixed M2M device without a random location update procedure. And, a $2^{nd}$ modified mode is the mode of performing a periodic or aperiodic location update on an M2M device (e.g., a mobile M2M device) without a paging. By the $2^{nd}$ optional method, an M2M device operates in an unconnected interval in the same manner of a current DCR mode operation applied to such a mobile communication system as IEEE 802.16 system, 3GPP LTE system and 3GPP LTE-A system. By the $3^{rd}$ optional method, an M2M device operates in an unconnected interval in the same manner of the idle mode applied to such a mobile communication system as IEEE 802.16 system, 3GPP LTE system and 3GPP LTE-A system. The $1^{st}$ modified idle mode and the $2^{nd}$ modified idle mode are described in detail with reference to FIG. 6A and FIG. 6B as follows.

Figure 6A:
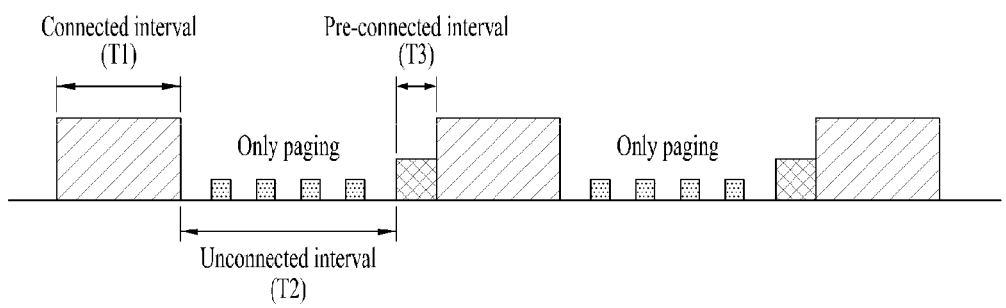
FIG. 6A and FIG. 6B are diagram to describe operations of an M2M device in a $1^{st}$ modified idle mode and a n2d modified idle mode according to the present invention, respectively.
Figure 6B:
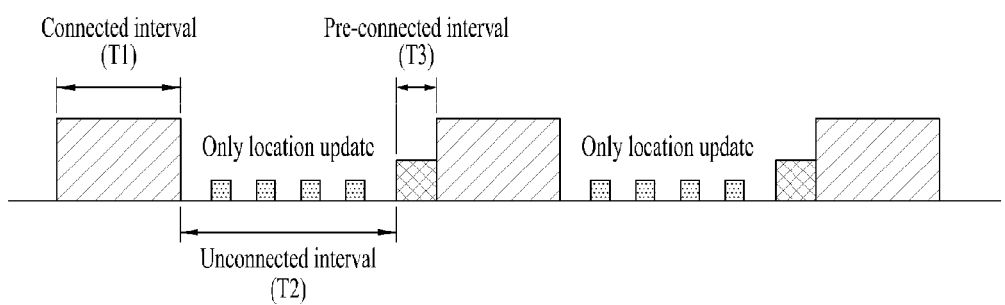

FIG. 6A and FIG. 6B are diagram to describe operations of an M2M device in a $1^{st}$ modified idle mode and a n2d modified idle mode according to the present invention, respectively.

Referring to FIG. 6A, a $1^{st}$ modified idle mode relates to a fixed M2M device. The fixed M2M device is able to perform a paging only in an unconnected interval T2 without a random location update procedure. Referring to FIG. 6B, a $2^{nd}$ modified idle mode relates to a mobile M2M device. For instance, the mobile M2M device may be able to just perform a periodic or aperiodic location update in the unconnected interval T2 without a paging.

In the following description, operations of an M2M device in a pre-connected interval T3 are explained.

First of all, an operation of a fixed M2M device in a pre-connected interval is explained. The fixed M2M device is synchronized with a downlink signal in a pre-connected interval. The fixed M2M device is able to receive and update cell-specific information (e.g., system information) from a base station. The operating method of the M2M device in the pre-connected interval includes three kinds of options.

According to a $1^{st}$ optional method, a base station (or a serving cell) can assign a device identifier (e.g., STID in IEEE 802.16m system, C-RNTI in 3GPP LTE or LTE-A system, etc.). The device identifier may be signaled to each M2M device via a page message on a downlink data channel. Alternatively, the device identifier may be signaled to each M2M device on a paging indication channel in a downlink control channel. In this case, the contents of the device identifiers (i.e., STID of IEEE 802.16m system for example of a mobile communication system, C-RNTI of 3GPP LTE or LTE-A system for example of a mobile communication system, etc.) are schematically described as follows. And, identifiers used to identify conventional mobile stations in a wireless communication system shall be schematically explained as follows. In particular, a process for a base station to send PDCCH to a mobile station in downlink is explained using an example of 3GPP LTE system case.

A base station determines a PDCCH format in accordance with a DCI (downlink control information), which is to be sent to a mobile station, and attaches a CRC (cyclic redundancy check) to a control information. The CRC is masked with a unique identifier, which will be called a radio network temporary identifier (hereinafter abbreviated RNTI), in accordance with an owner or usage of PDCCH. Meanwhile, IEEE 802.16m system uses a terminology called a station identifier (STID) as a concept corresponding to RNTI of 3GPP.

If the PDCCH is provided for a specific mobile station, the CRC can be masked with a unique identifier of a mobile station, e.g., C-RNTI (cell-RNTI). If the PDCCH is provided for a paging message, the CRC can be masked with a paging indication identifier, e.g., P-RNTI (paging-RNTI). If the PDCCH is provided for a system information, the CRC can be masked with a system information identifier, e.g., SI-RNTI (system information-RNTI). In order to indicate a random access response which is the response to a transmission of a random access preamble of a mobile station, the CRC can be masked with RA-RNTI (random access-RNTI). Table 1 shows examples of an identifier that masks the PDCCH.

TABLE 1

| Type | Identifier | Description |
|---|---|---|
| UE-specific | C-RNTI | used for the UE corresponding to the C-RNTI. |
| Common | P-RNTI | used for paging message. |
|  | SI-RNTI | used for system information (It could be differentiated according to the type of system information). |
|  | RA-RNTI | used for random access response (It could be differentiated according to subframe or PRACH slot index for UE PRACH transmission). |
|  | TPC-RNTI | used for uplink transmit power control command (It could be differentiated according to the index of UE TPC group). |

If C-RNTI is used, the PDCCH carries a control information for a corresponding specific mobile station. If a different RNTI is used, the PDCCH carries a shared control information received by all or a plurality of mobile stations within a cell. The base station generates a coded data by performing a channel coding on the CRC attached DCI. The base station then performs a rate matching according to the number of CCEs assigned to the PDCCH format. Subsequently, the base station generates modulated symbols by modulating the coded data. Thereafter, the base station maps the modulated symbols to the physical resource elements. Thus, the base station uses RNTI and STID as mobile station identifiers in LTE system and IEEE 802.16 system, respectively.

Regarding the above-described device identifiers, a base station is able to signal an M2M device identifier to each M2M device via a paging message on a DL data channel or via a paging indication channel in a DL control channel.

According to a $2^{nd}$ optional method, a base station (or a serving cell) can send a paging message, a paging indication channel in a downlink control channel, or dedicated ranging/RACH resources (e.g., time-frequency resource and a dedicated ranging/RACH sequence) for uplink synchronization to an M2M device in an unconnected interval. In this case, the time-frequency resource may be allocated to share a cell-specific ranging/RACH channel or the dedicated resource may be allocated to the M2M device in the unconnected interval. Specifically, when the time-frequency resource shares the cell-specific ranging/RACH channel, the dedicated ranging/RACH sequence may be selected from the handover ranging/RACH sequence. The synchronized ranging sequence and the channel structure used for the periodic ranging may be available for the uplink synchronization in the M2M unconnected interval.

A base station may be able to signal information on the dedicated ranging/RACH resource for the uplink synchronization to each M2M device via a paging message on a downlink data channel or a paging indication channel in a downlink control channel.

And, a $3^{rd}$ optional method relates to performing a fast ranging. The $3^{rd}$ optional method is described with reference to FIG. 7 as follows.

First of all, for a network entry (or a reentry), as mentioned in the foregoing description with reference to FIG. 4 and FIG. 5 (particularly, the steps S430 to S460 in FIG. 4, the steps S510 to S550 in FIG. 5), a mobile station sends a ranging (or RACH) sequence to a base station [1], and then receives a ranging (or RACH) response message from the base station [2]. Subsequently, the mobile station sends a ranging request (or an RRC connection request message) to the base station [3], and then receives a ranging response message (or an RRC connection contention resolution message) from the base station [4]. Thus, the mobile station should perform the above 4-step procedure ([1] to [4]).

Preferably, an M2M device (particularly, a fixed M2M device) for a network reentry skips the process for transmitting a contention based ranging (or RACH) sequence and receiving a response message in response to the transmitted ranging sequence and may directly sends a ranging request message (or an RRC connection request message) to a base station.

Figure 7:
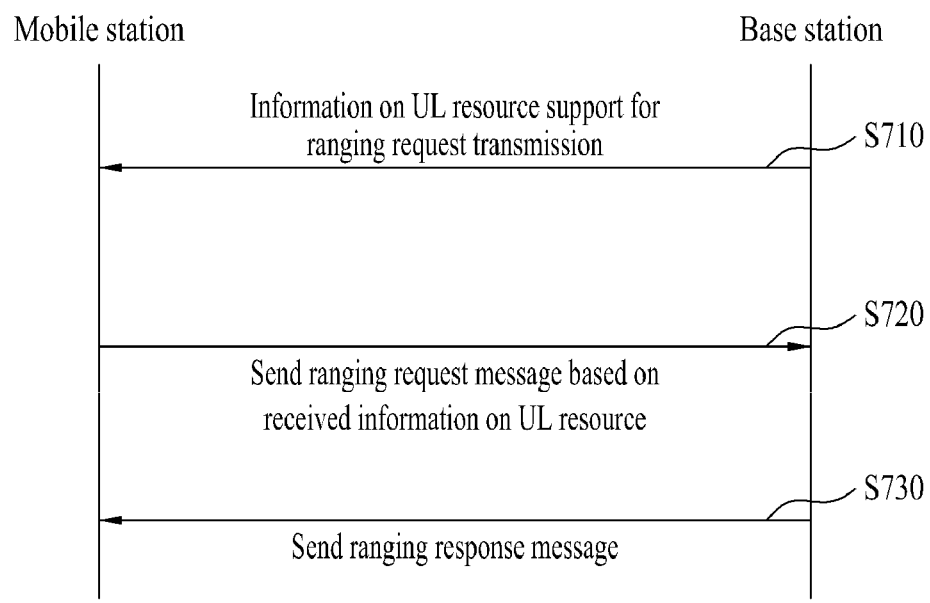
FIG. 7 is a diagram of a process for an M2M device to perform a network entry (or reentry) according to one embodiment of the present invention.

FIG. 7 is a diagram of a process for an M2M device to perform a network entry (or reentry) according to one embodiment of the present invention.

Referring to FIG. 7, a base station (or a serving base station) may be able to transmit information related to an uplink resource, which is required for transmitting a ranging request, to an M2M device requiring a network reentry or an M2M device in an unconnected interval. In this case, the information related to the uplink resource for the ranging request transmission may include location information (e.g., location in time-frequency region) of an uplink resource allocated to transmit a ranging request, size information of the uplink resource allocated to transmit the ranging request, timing information of a timing of transmitting control information indicating the uplink resource allocated to transmit the ranging request, and the like.

For example, the base station may be able to transmit information related to the uplink resource required for transmitting a ranging request to M2M devices, each of which needs a network reentry) via a downlink control channel (e.g., a paging indication channel) or a paging message (e.g., AAI-PAG-ADV in IEEE 802.16m system). Alternatively, the base station may be able to transmit information related to the uplink resource required for transmitting a ranging request to each M2M device via Assignment A-MAP (particularly, CDMA Allocation A-MAP IE) of a downlink control channel or a UL grant.

Based on the corresponding UL grant or CDMA Allocation A-MAP IE, each of the M2M devices directly sends a ranging request message via the allocated uplink (UL) resource. And, the serving base station is able to send a ranging response message to each of the M2M devices based on the ranging request message. In doing so, the M2M device may be able to send the ranging request message to the base station in a manner that a bandwidth request indicator is contained in the ranging request message. In response to the ranging request message, the base station may be able to send the ranging response message containing uplink bandwidth information to the corresponding M2M device.

In the following description, operations of a mobile M2M device of an M2M device having low mobility in an unconnected interval are explained.

First of all, a mobile M2M device of an M2M device having low mobility performs a location update (or a cell selection/reselection) as a $1^{st}$ step. In particular, in the $1^{st}$ step, the M2M device is synchronized with a DL signal and is then able to receive cell-specific broadcast information (e.g., system information). In doing so, a case that a selected serving cell or a selected serving base station is identical to a cell or a base station in a previous connected interval is described in the first place. A serving base station (or a serving cell) is able to assign a device identifier (e.g., STID in IEEE 802.16m system, C-RNTI in 3GPP LTE or LTE-A system, etc.). The device identifier may be signaled to each M2M device via a paging message on a DL data channel or via a DL control channel (e.g., a paging indication channel).

A base station (or a serving cell) is able to send dedicated ranging/RACH resources (e.g., time-frequency resource and a dedicated ranging/RACH sequence) for uplink synchronization to an M2M device in an unconnected interval. In this case, the time-frequency resource may be allocated to share a cell-specific ranging/RACH channel or the dedicated resource may be allocated to the M2M device in the unconnected interval. Specifically, when the time-frequency resource shares the cell-specific ranging/RACH channel, the dedicated ranging/RACH sequence may be selected from the handover ranging/RACH sequence. The base station is able to signal information on the dedicated ranging/RACH resource for the UL synchronization to each M2M device via a paging message on a DL data channel or via a DL control channel (e.g., a paging indication channel).

In the following description, a case that a selected serving cell or a selected serving base station is not identical to a cell or a base station in a previous connected interval is described. In the following description, a previous cell shall be named a serving cell and a new cell shall be named a target cell. If an M2M device selects a new cell, which is different from a serving cell in a previous connected interval, from an unconnected interval, the M2M device performs a network entry (reentry) into a target cell. In this case, the target cell informs the serving cell of the connection of the M2M device. The network entry (reentry) can be simplified.

First of all, the M2M device informs the target cell of the serving cell (e.g., a serving cell identifier) via AAI-RNG-REQ/RRC connection request message. The target cell makes a request for M2M device context/capability to the serving cell via a backbone network. Subsequently, the serving cell delivers the M2M device context/capability to the target cell and deletes the M2M device context/capability. Hence, the M2M device is able to skip the procedure of performance negotiation with the target cell and is able to configure automated device status transition.

Thus, the $2^{nd}$ modified mode, which is the mode of just performing a periodic or aperiodic location update without a paging to an M2M device (e.g., a mobile M2M device), may include the former procedures described in association with the $1^{st}$ modified idle mode and apply them thereto.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a method for an M2M (machine-to-machine) device and a base station to perform a network entry (or reentry) is industrially available for various wireless communication systems including 3GPP LTE-A, IEEE 802 and the like.

What is claimed is:

1. A method of performing a network reentry by a fixed machine-to-machine (M2M) device in an idle mode in a wireless communication system, the method comprising:
   receiving a paging message or a paging indicator channel (PICH) from a base station (BS),
   wherein the paging message or the PICH includes information related to a transmission timing of control information, the control information including uplink resource allocation information for a transmission of a ranging request message or an radio resource control (RRC) connection request message for the fixed M2M device, the uplink resource allocation information including a dedicatedly allocated resource to the fixed M2M device,
   receiving the control information from the BS, based on the information related to the transmission timing of the control information,
   wherein the control information and paging message are separately received, or
   wherein the control information and PICH are separately received respectively,
   transmitting the ranging request message or the RRC connection request message, without transmitting a contention-based ranging sequence or a random access channel (RACH) sequence to the BS through the dedicatedly allocated resource.

2. The method of claim 1, wherein the ranging request message comprises a bandwidth request indicator.

3. The method of claim 1, further comprising:
receiving a response message from the BS in response to the ranging request message or the RRC connection request message, the response message including assigned uplink bandwidth information.

4. A fixed machine-to-machine (M2M) device in an idle mode for performing a network reentry in a wireless communication system, the fixed M2M device comprising:
a receiver configured to receive a paging message or a paging indicator channel (PICH) from a base station (BS),
wherein the paging message or the PICH includes information related to transmission timing of control information, the control information including uplink resource allocation information for transmission of a ranging request message or an radio resource control (RRC) connection request message for the fixed M2M device, the uplink resource allocation information including a dedicatedly allocated resource to the fixed M2M device,
wherein the receiver is configured to receive the control information from the BS based on the information related to the transmission timing of the control information,
wherein the control information and paging message are separately received, or
wherein the control information and PICH are separately received,
a transmitter configured to transmit, the ranging request message or the RRC connection request message, without transmitting a contention-based ranging sequence or a random access channel (RACH) sequence to the BS through the dedicatedly allocated resource.

5. The M2M device of claim 4, wherein the ranging request message comprises a bandwidth request indicator.

6. The M2M device of claim 4, wherein the receiver is further configured to receive a response message from the BS in response to the ranging request message or the RRC connection request message, the response message including assigned uplink bandwidth information.

7. A method of performing a network reentry by a base station (BS) with a fixed machine-to-machine (M2M) device in an idle mode in a wireless communication system, the method comprising:
transmitting a paging message or a paging indicator channel (PICH) to the fixed M2M device,
wherein the paging message or the PICH includes information related to transmission timing of control information, the control information including uplink resource allocation information for transmission of a ranging request message or an radio resource control (RRC) connection request message for the fixed M2M device, the uplink resource allocation information including dedicatedly allocated resource to the fixed M2M device,
transmitting, the control information to the BS, based on the information related to the transmission timing of the control information,
wherein the control information and paging message are separately transmitted, or
wherein the control information and the PICH are separately transmitted,
receiving, the ranging request message or the RRC connection request message, without receiving a contention-based ranging sequence or a random access channel (RACH) sequence, from the fixed M2M device through the dedicatedly allocated resource.

8. The method of claim 7, wherein the ranging request message comprises a bandwidth request indicator.

9. A base station (BS) for performing a network reentry with a fixed machine-to-machine (M2M) device in an idle mode in a wireless communication system, the BS comprising:
a transmitter configured to transmit a paging message or a paging indicator channel (PICH) to the fixed M2M device,
wherein the paging message or the PICH includes information related to transmission timing of control information, the control information including uplink resource allocation information for a transmission of a ranging request message or an radio resource control (RRC) connection request message for the fixed M2M device, the uplink resource allocation information including dedicatedly allocated resource to the fixed M2M device,
wherein the transmitter is further configured to transmit the control information, to the M2M device, based on the information related to the transmission timing of the control information,
a receiver configured to receive the ranging request message or the RRC connection request message, without receiving a contention-based ranging sequence or a random access channel (RACH) sequence from the M2M device through the dedicatedly allocated resource.

10. The method of claim 9, wherein the ranging request message comprises a bandwidth request indicator.

* * * * *